(12) United States Patent
Morita et al.

(10) Patent No.: US 12,171,340 B2
(45) Date of Patent: Dec. 24, 2024

(54) CONNECTION STRUCTURE AND ATTACHMENT STRUCTURE

(71) Applicant: Nintendo Co., Ltd., Kyoto (JP)

(72) Inventors: Kensuke Morita, Kyoto (JP); Noboru Wakitani, Kyoto (JP); Masaki Amano, Kyoto (JP); Tetsuji Kawamura, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 205 days.

(21) Appl. No.: 18/081,314

(22) Filed: Dec. 14, 2022

(65) Prior Publication Data

US 2023/0200551 A1 Jun. 29, 2023

(30) Foreign Application Priority Data

Dec. 27, 2021 (JP) ................................. 2021-212359

(51) Int. Cl.
*H01F 7/02* (2006.01)
*A47C 21/02* (2006.01)
*F16B 2/10* (2006.01)

(52) U.S. Cl.
CPC ................ *A47C 21/02* (2013.01); *F16B 2/10* (2013.01); *H01F 7/02* (2013.01)

(58) Field of Classification Search
CPC ... A47C 21/02; F16B 2/10; H01F 7/02; F16G 11/101; F16M 11/041; F16M 13/022; G06F 1/1632; H04M 1/04
USPC ........................................................ 335/285
See application file for complete search history.

(56) References Cited

U.S. PATENT DOCUMENTS

| | | | | |
|---|---|---|---|---|
| 4,479,596 | A * | 10/1984 | Swanson | A45F 5/02 224/236 |
| 5,404,602 | A * | 4/1995 | Kondo | A47C 21/022 24/514 |
| 6,888,940 | B1 * | 5/2005 | Deppen | B60R 11/0241 379/454 |
| 2003/0000976 | A1 * | 1/2003 | Malhotra | A45F 5/02 224/269 |

(Continued)

FOREIGN PATENT DOCUMENTS

| | | |
|---|---|---|
| JP | 2000-189227 | 7/2000 |
| WO | 2019/183227 | 9/2019 |

*Primary Examiner* — Shawki S Ismail
*Assistant Examiner* — Lisa N Homza
(74) *Attorney, Agent, or Firm* — Nixon & Vanderhye PC

(57) ABSTRACT

A connection structure includes a first apparatus and a second apparatus. The first apparatus includes a first contact portion and a surrounding wall surface. The second apparatus includes a second contact portion and a hollow projection. The first apparatus and the second apparatus are connected as being rotatable relatively to each other around a magnetic force direction and attachable to and detachable from each other, as a result of attraction by magnetic force. The projection is located with a clearance being interposed between the wall surface and the first contact portion, where the projection can be tilted in accordance with pulling including a direction component perpendicular to the magnetic force direction. In the first apparatus, a clearance between a top portion and the projection in a first direction is larger than a clearance between the top portion and the projection in a second direction different from the first direction.

10 Claims, 12 Drawing Sheets

(56) References Cited

U.S. PATENT DOCUMENTS

| | | | |
|---|---|---|---|
| 2010/0206830 A1* | 8/2010 | Kaneko | B66C 23/00 |
| | | | 212/270 |
| 2017/0095066 A1* | 4/2017 | Martel | A45F 5/004 |
| 2018/0196466 A1* | 7/2018 | Koriyama | G06F 1/166 |
| 2019/0271600 A1* | 9/2019 | Maruko | G01K 1/08 |
| 2020/0237083 A1* | 7/2020 | Jin | A45C 11/00 |
| 2021/0046885 A1 | 2/2021 | Jankura et al. | |
| 2021/0063247 A1* | 3/2021 | Inoue | G01K 1/08 |

* cited by examiner

CONNECTION STRUCTURE AND ATTACHMENT STRUCTURE

This nonprovisional application claims priority on Japanese Patent Application No. 2021-212359 filed with the Japan Patent Office on Dec. 27, 2021, the entire contents of which are hereby incorporated by reference.

FIELD

The present disclosure relates to a connection structure and an attachment structure.

BACKGROUND AND SUMMARY

A portable telephone holder has been known.

An exemplary embodiment provides a connection structure that includes a first apparatus and a second apparatus. The first apparatus includes a first bottom surface, a first contact portion, and a surrounding wall surface. The first contact portion protrudes from the first bottom surface, includes a first contact surface at a top portion, and includes a first magnetic element. The surrounding wall surface protrudes from the first bottom surface above the first contact surface to surround the top portion. The second apparatus includes a second contact portion and a hollow projection. The second contact portion defines a second contact surface and includes a second magnetic element. The hollow projection surrounds the second contact portion. The first apparatus and the second apparatus are connected as being rotatable relatively to each other around a magnetic force direction and attachable to and detachable from each other as a result of contact between the first contact surface and the second contact surface by attraction of the first magnetic element and the second magnetic element to each other by magnetic force. The projection is located between the wall surface and the first contact portion with a clearance being interposed where the projection can be tilted in accordance with pulling including a direction component perpendicular to the magnetic force direction. In the first apparatus, a clearance between the top portion and the projection in a first direction of directions perpendicular to the magnetic force direction is larger than a clearance between the top portion and the projection in a second direction of the directions perpendicular to the magnetic force direction, the second direction being different from the first direction.

According to the connection structure according to the present disclosure, in the first apparatus, the clearance between the top portion and the projection in the first direction of the directions perpendicular to the magnetic force direction is larger than the clearance between the top portion and the projection in the second direction different from the first direction. Therefore, the projection is tilted to a larger extent on a side of the first direction than on the other side. Therefore, the second apparatus is more readily detached when it is pulled toward the first direction than toward the second direction. Thus, for example, when a user intentionally pulls the second apparatus in a certain direction, the second apparatus is readily detached, and in contrast, when the second apparatus is unintentionally pulled in another direction, easy detachment of the second apparatus can be suppressed.

According to the connection structure, the wall surface may be in a circular surrounding shape. The projection may be annularly hollow. The first contact portion may be in such a shape that a part of an outer circumferential surface of a column is missing. Thus, regardless of a position of rotation of the second apparatus relative to the first apparatus, an angle of tilting at the time of tilting on the side of the second direction can be uniform.

According to the connection structure, in a cross-section perpendicular to a magnetic force direction Z, the first contact portion may have an arc of a length equal to or longer than a semicircular arc. If the arc of the first contact portion in the cross-section is smaller than the semicircle while the first contact portion is accommodated in the inside of the annularly hollow projection, the first contact portion can move relatively in a lateral direction and wobbling occurs. If the first contact portion has an arc longer than the semicircle, on the other hand, the inner circumferential surface of the projection is caught by a portion of the arc longer than the semicircle. Therefore, wobbling in the lateral direction can be suppressed.

According to the connection structure, in a cross-section perpendicular to the magnetic force direction, the first contact portion may include a linear portion and an arc-shaped portion continuous to opposing ends of the linear portion. A central angle of the arc-shaped portion may be larger than 180°. Wobbling in the lateral direction can thus further be suppressed.

According to the connection structure, the second apparatus may include a second bottom surface. The second contact portion may protrude from the second bottom surface. If the second contact portion is located at a position deeper than the second bottom surface, in an attempt to bring the first contact portion and the second contact portion in contact with each other, the first contact portion may be caught by the second bottom surface and may not reach the second contact portion. When the second contact portion protrudes from the second bottom surface, the first contact surface and the second contact surface can more reliably be brought in contact with each other. Therefore, the first contact surface and the second contact surface being unintentionally distant from each other can be suppressed.

According to the connection structure, the projection may protrude from the second bottom surface. The second contact portion may protrude such that the second contact surface is lower than the projection. Thus, influence by magnetism such as attraction and contact of an object close to the connection structure to the second contact surface can be suppressed.

According to the connection structure, when the projection is tilted, tilting may be stopped by contact of the projection with at least one of the first contact portion and the wall surface. Regarding an angle of tilting at the time when tilting of the projection is stopped, the angle when the projection is tilted in the first direction may be larger than the angle when the projection is tilted in the second direction.

Since tilting of the projection is stopped, the second apparatus is less likely to be detached from the first apparatus even when lateral force is further increased. Therefore, unintended removal of the second apparatus from the first apparatus can be suppressed. For removal of the second apparatus from a tilted state, force in the magnetic force direction is required. The second apparatus is more greatly tilted when it is tilted in the first direction than in the second direction. Since a distance between the first contact surface and the second contact surface is longer as the angle of tilting is larger, magnetic force is relatively weaker. Therefore, the second apparatus is more readily detached from the first apparatus when it is tilted in the first direction than in the second direction. In tilting the second apparatus in the second direction, magnetic force is relatively strong, however, magnetic force is weakened by tilting. Therefore, when force strong to some extent is applied, the second apparatus can be removed from the first apparatus.

According to the connection structure, regarding an angle of tilting at the time when the projection is tilted and comes in contact with both of the first contact portion and the wall surface, the angle when the projection is tilted in the first direction may be larger than the angle when the projection is tilted in the second direction. Thus, the second apparatus can more readily be detached from the first apparatus when it is tilted in the first direction than in the second direction.

According to the connection structure, regarding an angle of tilting at the time when the projection is tilted and comes in contact with the wall surface, the angle when the projection is tilted in the first direction may be larger than the angle when the projection is tilted in the second direction. Thus, the second apparatus can more readily be detached from the first apparatus when it is tilted in the first direction than in the second direction.

According to the connection structure, the first magnetic element may include a first magnet. The second magnetic element may include a second magnet. A member that suppresses a magnetic flux density may be provided on the first contact surface or between the first contact surface and the first magnet or on the second contact surface or between the second contact surface and the second magnet.

When only a magnet with strong magnetic force is employed, unintended attraction and contact may occur. When only a magnet with weak magnetic force is employed, on the other hand, the magnet is weak in attraction and contact force (difficulty in detachment) although it has attraction force (ease in attachment), and unintended removal may occur. If only a yolk member that suppresses a magnetic flux density is employed instead of a magnet, it has weak attraction force although it has attraction and contact force. Then, by employing a magnet with magnetic force strong to some extent and a yolk member, while the yolk member suppresses excessively large attraction and contact force of the magnet to suppress unintended removal, with attraction force of the magnet and the yolk member, the first apparatus and the second apparatus can swiftly be attracted and brought in contact with each other by being brought closer to each other to some extent.

An exemplary embodiment provides an attachment structure that includes a bedclothes fitting instrument fitted to bedclothes and an instrument. The bedclothes fitting instrument includes a bedclothes fixed portion and a first contact portion. The bedclothes fixed portion is fixed to the bedclothes. The first contact portion includes a first magnetic element. The instrument includes a second contact portion. The second contact portion includes a second magnetic element. The bedclothes fitting instrument and the instrument are brought in contact as being rotatable relatively to each other around a magnetic force direction and attachable to and detachable from each other as a result of contact between the first contact portion and the second contact portion by magnetic force of the first magnetic element and the second magnetic element. The bedclothes fitting instrument and the instrument include a movement restriction portion. The movement restriction portion restricts movement of the first contact portion and the second contact portion relative to each other in a direction perpendicular the magnetic force direction while the first contact portion and the second contact portion are brought in contact with each other. The bedclothes fitting instrument and the instrument include a pivot restriction portion. The pivot restriction portion restricts pivot around a side opposite to a side of the bedclothes fixed portion with respect to the first contact portion, more than pivot around the side of the bedclothes fixed portion, when the first contact portion and the second contact portion pivot relatively to each other as moving away from each other in the magnetic force direction from a state that the first contact portion and the second contact portion are brought in contact with each other.

According to the attachment structure according to the present disclosure, pivot around the side opposite to the side of the bedclothes fixed portion with respect to the first contact portion is restricted more than pivot around the side of the bedclothes fixed portion. Therefore, during sleep or the like, while removal of the second apparatus by unintended pulling in a direction away from the bedclothes is suppressed, the second apparatus can readily be detached when force to pull toward the bedclothes is intentionally applied thereto.

According to the attachment structure, the instrument may include a projection that surrounds the second contact portion. The pivot restriction portion may be composed of a protrusion provided to surround a circumference of the first contact portion and an inner circumferential surface of the projection.

According to the attachment structure, in a cross-section perpendicular to the magnetic force direction, the protrusion may be in a C shape.

According to the attachment structure, the instrument may include a projection that surrounds the second contact portion. The pivot restriction portion may be composed of an outer circumferential surface of the first contact portion and an inner circumferential surface of the projection.

According to the attachment structure, in a cross-section perpendicular to the magnetic force direction, the first contact portion may have an arc longer than a semicircle.

According to the attachment structure, in a cross-section perpendicular to the magnetic force direction, the first contact portion may include a linear portion and an arc-shaped portion continuous to opposing ends of the linear portion. A central angle of the arc-shaped portion may be larger than 180°.

According to the attachment structure, when the first contact portion and the second contact portion pivot relatively to each other as moving away from each other in the magnetic force direction from the state that the first contact portion and the second contact portion are brought in contact with each other, an angle at which pivot of the instrument is restricted when the instrument pivots around the side of the bedclothes fixed portion may be larger than an angle at which pivot of the instrument is restricted when the instrument pivots around the side opposite to the side of the bedclothes fixed portion with respect to the first contact portion. Thus, the second apparatus can more readily be detached from the first apparatus by tilting the second apparatus toward the bedclothes fixed portion than toward the side opposite to the side of the bedclothes fixed portion.

According to the attachment structure, when the first contact portion and the second contact portion pivot relatively to each other as moving away from each other in the magnetic force direction from the state that the first contact portion and the second contact portion are brought in contact with each other, the pivot restriction portion does not restrict pivot around the side of the bedclothes fixed portion but may restrict pivot around the side opposite to the side of the bedclothes fixed portion with respect to the first contact portion. Thus, the second apparatus can more readily be detached from the first apparatus by tilting the second apparatus toward the bedclothes fixed portion than toward the side opposite to the side of the bedclothes fixed portion.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
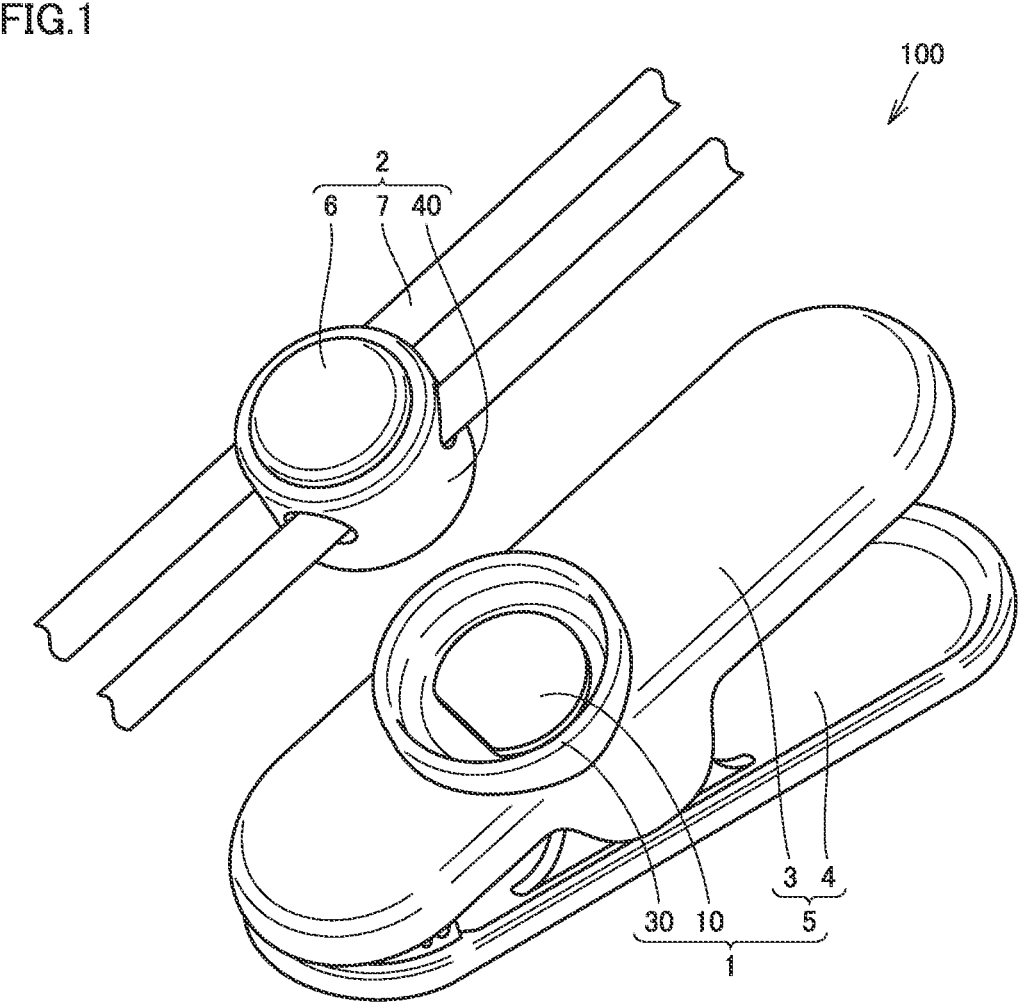
FIG. 1 shows an exemplary illustrative non-limiting drawing of an exploded schematic perspective view showing a construction of a connection structure according to a first embodiment.

An embodiment of the present disclosure will be described in detail with reference to the drawings. The same or corresponding elements in the drawings have the same reference characters allotted and description thereof will not be repeated.

First Embodiment

A construction of a connection structure 100 according to a first embodiment will initially be described.
[A. Connection Structure]
FIG. 1 is an exploded schematic perspective view showing a construction of connection structure 100 according to the first embodiment. As shown in FIG. 1, connection structure 100 according to the first embodiment mainly includes a first apparatus 1 and a second apparatus 2. First apparatus 1 mainly includes a first contact portion 10, an annular wall portion 30, and a fastener 5. First contact portion 10 is, for example, in such a shape that a part of an outer circumferential surface of a column is missing. Annular wall portion 30 is provided to surround first contact portion 10. Fastener 5 includes a first pinch member 3 and a second pinch member 4. First contact portion 10 and annular wall portion 30 are provided in first pinch member 3. Second apparatus 2 mainly includes a hollow member 40, a cord 7, and a cord holder 6. Cord 7 is attached to hollow member 40. A part of cord holder 6 is arranged in a region surrounded by an inner circumferential surface of hollow member 40.

Figure 2:
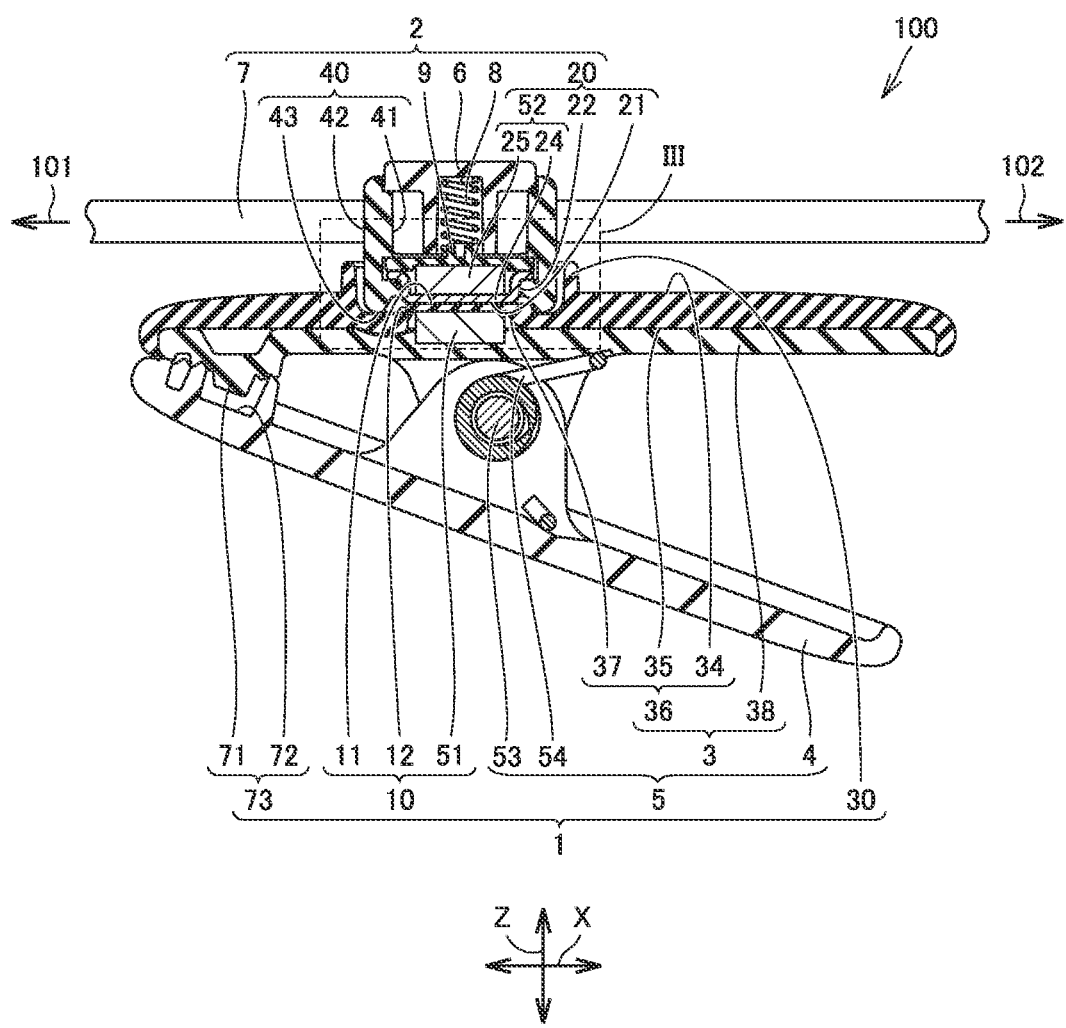
FIG. 2 shows an exemplary illustrative non-limiting drawing of a first schematic cross-sectional view showing the construction of the connection structure according to the first embodiment.

FIG. 2 is a first schematic cross-sectional view showing the construction of connection structure 100 according to the first embodiment. As shown in FIG. 2, fastener 5 further includes a shaft member 53 and a spring member 54. Spring member 54 is wound around shaft member 53. Spring member 54 has one end attached to first pinch member 3. Spring member 54 has the other end attached to second pinch member 4. Fastener 5 includes a fixing portion 73. Fixing portion 73 includes a first pressing member 71 and a second pressing member 72. While no external force is applied to fastener 5, fastener 5 is biased by spring member 54 such that first pressing member 71 and second pressing member 72 are brought closer to each other.

As shown in FIG. 2, first apparatus 1 includes a first contact portion 10. First contact portion 10 includes a first contact surface 11 and a first magnetic element 51. Second apparatus 2 includes a second contact portion 20. Second contact portion 20 includes a second contact surface 21 and a second magnetic element 52. In first apparatus 1 and second apparatus 2, first magnetic element 51 and second magnetic element 52 are attracted to each other by magnetic force. First contact surface 11 and second contact surface 21 are thus brought in contact with each other.

A direction in parallel to a direction in which first magnetic element 51 and second magnetic element 52 are attracted to each other by magnetic force is herein defined as a magnetic force direction Z. A direction from first contact portion 10 toward second contact portion 20 is defined as an upper side. In contrast, a direction from second contact portion 20 toward first contact portion 10 is defined as a lower side. A direction perpendicular to magnetic force direction Z is defined as an in-plane direction. A direction in parallel to a direction from first contact portion 10 toward fixing portion 73 in the in-plane direction is defined as a lateral direction X. A direction perpendicular to each of magnetic force direction Z and lateral direction X is defined as a front-rear direction Y (see FIG. 4).

Each of a first direction 101 and a second direction 102 is a direction perpendicular to magnetic force direction Z. Each of first direction 101 and second direction 102 is a direction with first contact portion 10 being defined as a reference. From another point of view, each of first direction 101 and second direction 102 may be a direction radially extending from first contact portion 10. Each of first direction 101 and second direction 102 is, for example, in parallel to lateral direction X. Second direction 102 is different from first direction 101. Second direction 102 is, for example, a direction opposite to first direction 101. Second direction 102 should only be different from first direction 101 and it is not limited to a direction opposite to first direction 101.

First apparatus 1 and second apparatus 2 are connected to each other as being rotatable relatively to each other around magnetic force direction Z and attachable to and detachable from each other. Second contact surface 21 is slidable over first contact surface 11. Second apparatus 2 is rotatable with respect to first apparatus 1. A rotation axis of second apparatus 2 is, for example, perpendicular to second contact surface 21. Second contact surface 21 may be circular. The rotation axis of second apparatus 2 passes, for example, through a center of second contact surface 21.

Figure 3:
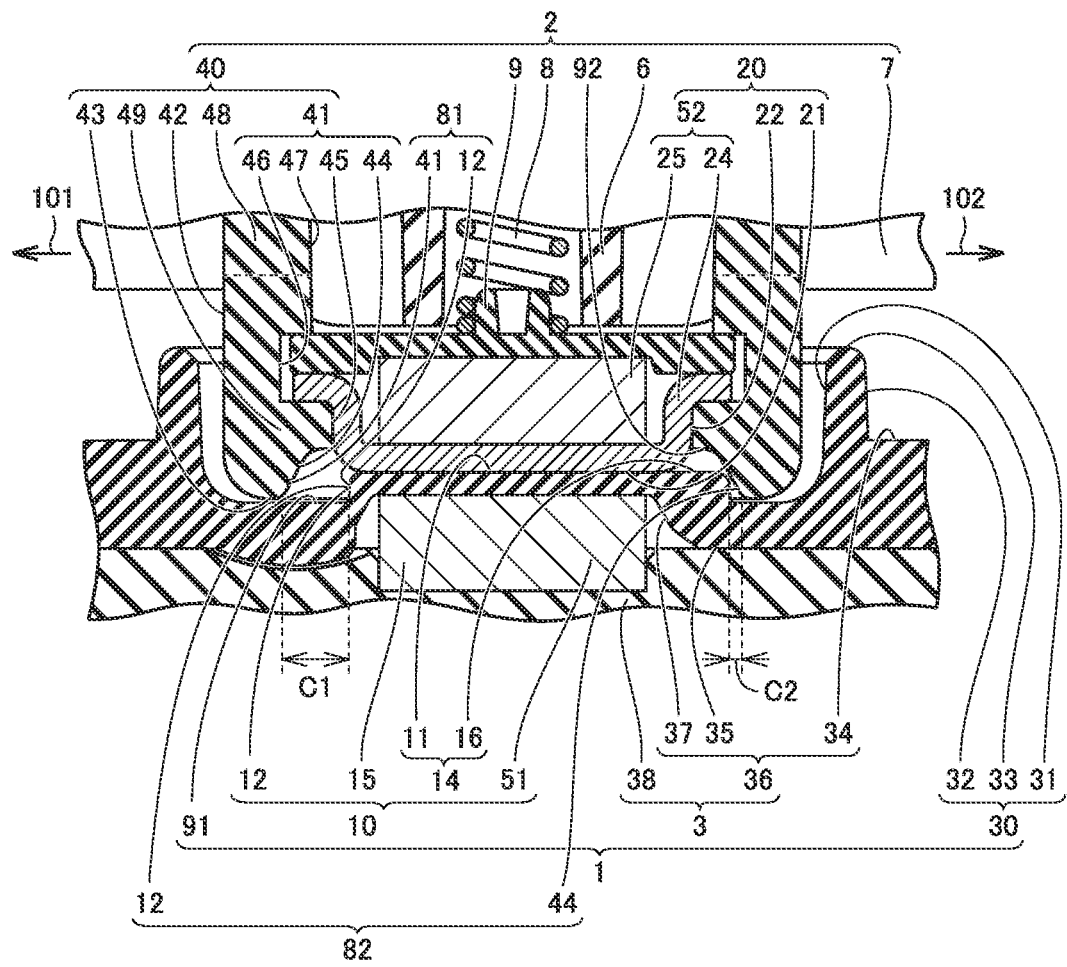
FIG. 3 shows an exemplary illustrative non-limiting drawing of an enlarged schematic diagram of a region III in FIG. 2.
Figure 3:
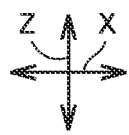

FIG. 3 is an enlarged schematic diagram of a region III in FIG. 2. As shown in FIG. 3, annular wall portion 30 includes a first wall surface 31, a second wall surface 32, and a first top surface 33. First wall surface 31 is in a surrounding shape. First wall surface 31 may be in a circular surrounding shape or a prismatic surrounding shape. Similarly, second wall surface 32 is in a surrounding shape. Second wall surface 32 may be in a circular surrounding shape or a prismatic surrounding shape. Second wall surface 32 is located on the outside of first wall surface 31. Second wall surface 32 surrounds first wall surface 31. First top surface 33 is continuous to each of first wall surface 31 and second wall surface 32.

First apparatus 1 includes a first bottom surface 91 and a first upper surface 34. First bottom surface 91 is continuous to first wall surface 31. First upper surface 34 is continuous to second wall surface 32. In magnetic force direction Z, first bottom surface 91 is located below first upper surface 34. From another point of view, in magnetic force direction Z, first upper surface 34 is located between first bottom surface 91 and first top surface 33. In magnetic force direction Z, first bottom surface 91 may be located above first upper surface 34.

As shown in FIG. 3, first contact portion 10 protrudes from first bottom surface 91. First contact portion 10 includes a first outer circumferential surface 12 and a top portion 14. First outer circumferential surface 12 is continuous to first bottom surface 91. First outer circumferential surface 12 extends upward from first bottom surface 91. Top portion 14 includes first contact surface 11 and a third upper surface 16. Third upper surface 16 is continuous to first contact surface 11. First contact surface 11 is in contact with second contact surface 21. Third upper surface 16 may be a portion not in contact with second contact surface 21. First wall surface 31 protrudes from first bottom surface 91 above first contact surface 11. In magnetic force direction Z, first top surface 33 is located above first contact surface 11. In magnetic force direction Z, first contact surface 11 is located between first bottom surface 91 and first top surface 33.

As shown in FIGS. 2 and 3, first pinch member 3 includes a first plate-shaped member 36 and a second plate-shaped member 38. Each of first plate-shaped member 36 and second plate-shaped member 38 is made, for example, of a resin. First plate-shaped member 36 includes a first lower surface 35. First lower surface 35 is located opposite to each of first bottom surface 91 and first upper surface 34. First lower surface 35 is provided with a first recess 37. First recess 37 is provided under first contact surface 11.

First magnetic element 51 is composed, for example, of a magnet (a first magnet 15). First magnet 15 is arranged in first recess 37. Second plate-shaped member 38 is located under first plate-shaped member 36. First magnet 15 lies between first plate-shaped member 36 and second plate-shaped member 38. A yolk member (not shown) that suppresses a magnetic flux density may be provided on first contact surface 11 or between first contact surface 11 and first magnet 15. The yolk member is made, for example, of iron. First contact surface 11 may be formed from the yolk member. First contact surface 11 may be composed, for example, of a resin or first magnet 15.

As shown in FIG. 3, second magnetic element 52 includes a yolk member 24 and a second magnet 25. Yolk member 24 may be provided on second contact surface 21 or between second contact surface 21 and second magnet 25. In magnetic force direction Z, second magnet 25 is located above second contact surface 21. In magnetic force direction Z, second magnet 25 is provided between yolk member 24 and a reception plate 9. Second contact surface 21 is formed, for example, from yolk member 24. Second contact surface 21 may be composed, for example, of a resin or a magnet.

Second apparatus 2 includes a second bottom surface 92. Second bottom surface 92 is formed from hollow member 40. Second bottom surface 92 may be opposed to top portion 14. Second bottom surface 92 may be opposed to first bottom surface 91. Second contact portion 20 includes a second outer surface 22. Second outer surface 22 is continuous to second contact surface 21. Second outer surface 22 is, for example, in a shape of a circular tube. In magnetic force direction Z, second bottom surface 92 is located above second contact surface 21. Second contact portion 20 may protrude from second bottom surface 92. In the in-plane direction, second bottom surface 92 is located on the outside of second contact surface 21. Second contact portion 20 does not have to protrude from second bottom surface 92.

Hollow member 40 includes a main body portion 48 and a projection 49. Projection 49 is continuous to main body portion 48. Projection 49 is hollow. Projection 49 may be in a shape of an annular tube or a prismatic tube. Similarly, main body portion 48 is hollow. Main body portion 48 may be in a shape of an annular tube or a prismatic tube. Main body portion 48 and projection 49 may integrally be formed. Projection 49 is provided under main body portion 48. Projection 49 may protrude from second bottom surface 92.

Hollow member 40 includes a second inner circumferential surface 41, a second outer circumferential surface 42, and a second lower surface 43. Second outer circumferential surface 42 is located on the outside of second inner circumferential surface 41. Each of second inner circumferential surface 41 and second outer circumferential surface 42 is continuous to second lower surface 43. Second inner circumferential surface 41 is provided with a second recess 46. A part of yolk member 24 and a part of coil reception plate 9 may be inserted in second recess 46. Each of yolk member 24 and coil reception plate 9 may be in contact with projection 49.

Second inner circumferential surface 41 includes a first inner circumferential surface portion 44, a second inner circumferential surface portion 45, and a third inner circumferential surface portion 47. First inner circumferential surface portion 44 is continuous to second lower surface 43. First inner circumferential surface portion 44 is opposed to first outer circumferential surface 12. As shown in FIG. 3, first inner circumferential surface portion 44 may be inclined with respect to magnetic force direction Z such that an interval in lateral direction X is greater toward the lower side. In magnetic force direction Z, second inner circumferential surface portion 45 is located above first inner circumferential surface portion 44. Second inner circumferential surface portion 45 extends along magnetic force direction Z. Second inner circumferential surface portion 45 is in contact with second outer surface 22 of yolk member 24.

In magnetic force direction Z, third inner circumferential surface portion 47 is located above second inner circumferential surface portion 45. In magnetic force direction Z, second recess 46 is located between second inner circumferential surface portion 45 and third inner circumferential surface portion 47. Second lower surface 43, a part of second inner circumferential surface 41, and a part of second outer circumferential surface 42 are defined by projection 49. Projection 49 surrounds second contact portion 20. Second contact portion 20 protrudes such that second contact surface 21 becomes lower than projection 49. In magnetic force direction Z, second contact surface 21 is located above second lower surface 43 of projection 49.

As shown in FIG. 3, projection 49 is located between first wall surface 31 and first contact portion 10 with a clearance where the projection can be tilted in accordance with pulling including a direction component perpendicular to magnetic force direction Z being interposed. In lateral direction X, a gap is provided between projection 49 and first wall surface 31. In lateral direction X, a gap is provided between projection 49 and first outer circumferential surface 12 of first contact portion 10.

As shown in FIG. 3, a clearance (a first clearance C1) between top portion 14 of first contact portion 10 and projection 49 in first direction 101 is larger than a clearance (a second clearance C2) between top portion 14 of first contact portion 10 and projection 49 in second direction 102. First clearance C1 may be a distance between a boundary between top portion 14 and first outer circumferential surface 12 and a boundary between second lower surface 43 and second inner circumferential surface 41 in first direction 101. Second clearance C2 may be a distance between a boundary between top portion 14 and first outer circumferential surface 12 and a boundary between second lower surface 43 and second inner circumferential surface 41 in second direction 102.

Though an example in which the gap is provided between projection 49 and first outer circumferential surface 12 of first contact portion 10 is described above, the present disclosure is not limited to the construction above. In a connection structure according to a modification, no gap may be provided between projection 49 and first outer circumferential surface 12 of first contact portion 10.

Figure 4:
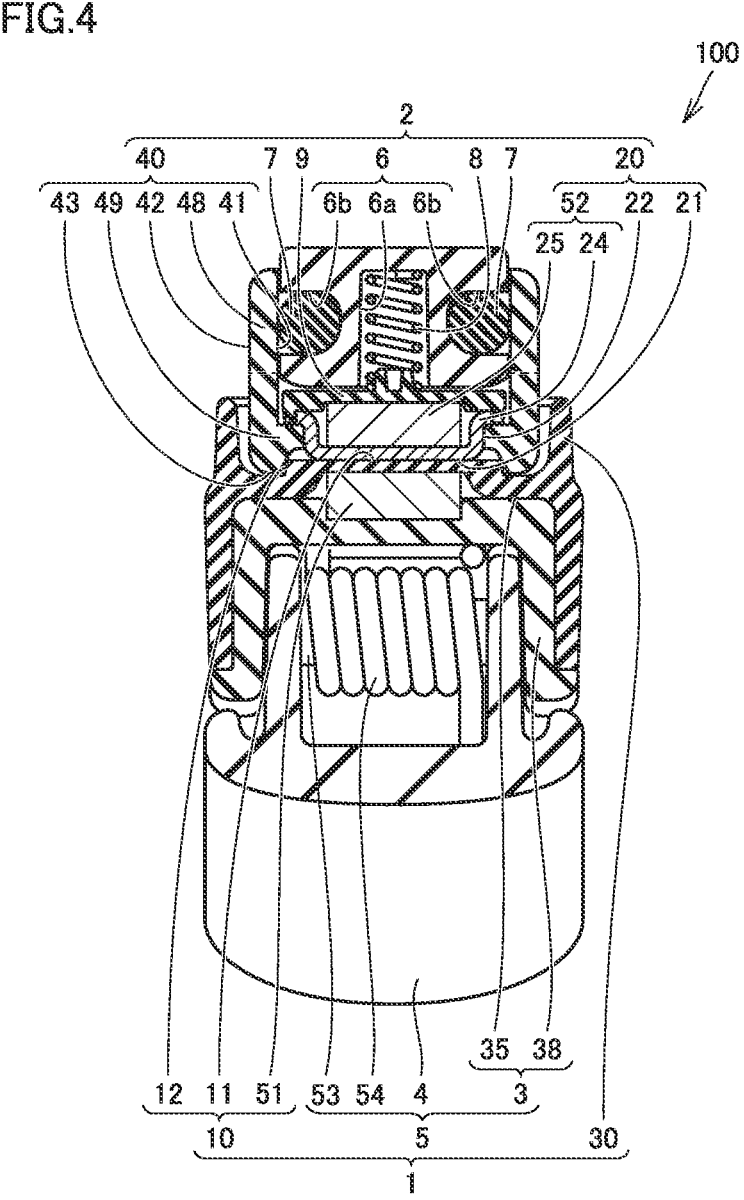
FIG. 4 shows an exemplary illustrative non-limiting drawing of a second schematic cross-sectional view showing the construction of the connection structure according to the first embodiment.
Figure 4:
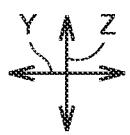

FIG. 4 is a second schematic cross-sectional view showing the construction of connection structure 100 according to the first embodiment. The cross-section shown in FIG. 4 is in parallel to each of magnetic force direction Z and front-rear direction Y. The cross-section shown in FIG. 4 is perpendicular to the cross-section shown in FIG. 2.

As shown in FIG. 4, second apparatus 2 includes a coil spring 8 and reception plate 9. Coil spring 8 is provided on reception plate 9. Coil spring 8 is provided in a coil spring arrangement hole 6a provided in cord holder 6. Cord holder 6 is biased upward by coil spring 8. Reception plate 9 is arranged in a region surrounded by second inner circumferential surface 41 of hollow member 40. Cord holder 6 is provided with a pair of third recesses 6b. The pair of third recesses 6b is provided on opposing sides of coil spring arrangement hole 6a. Cords 7 are arranged in the pair of third recesses 6b. Each of the pair of third recesses 6b is covered with second inner circumferential surface 41 of hollow member 40.

[B. First Apparatus]

Figure 5:
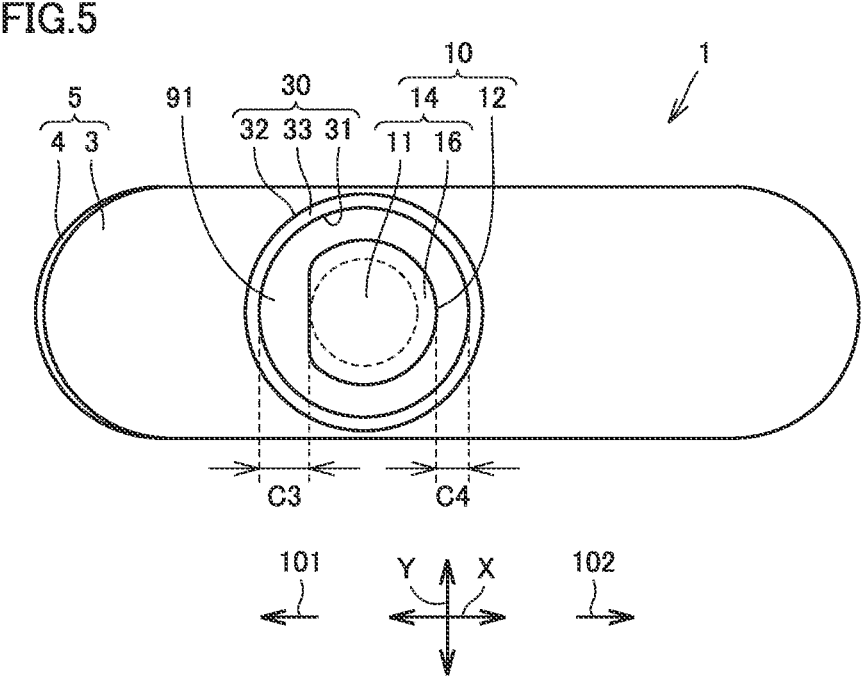
FIG. 5 shows an exemplary illustrative non-limiting drawing of a schematic top view showing a construction of a first apparatus of the connection structure according to the first embodiment.

FIG. 5 is a schematic top view showing a construction of first apparatus 1 of connection structure 100 according to the first embodiment. As shown in FIG. 5, when viewed in magnetic force direction Z, first wall surface 31 of annular wall portion 30 surrounds top portion 14 of first contact portion 10. First wall surface 31 is distant from first outer circumferential surface 12 of first contact portion 10 around the entire circumference of first wall surface 31. A clearance (a third clearance C3) between first wall surface 31 and first outer circumferential surface 12 in first direction 101 is larger than a clearance (a fourth clearance C4) between first wall surface 31 and first outer circumferential surface 12 in second direction 102.

Figure 6:
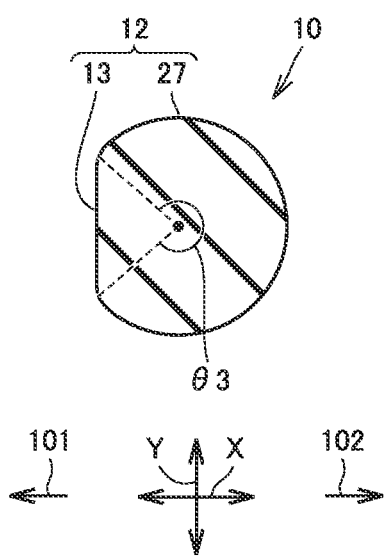
FIG. 6 shows an exemplary illustrative non-limiting drawing of a schematic cross-sectional view showing a construction of a first contact portion.

FIG. 6 is a schematic cross-sectional view showing a construction of first contact portion 10. The cross-section shown in FIG. 6 is perpendicular to magnetic force direction Z. As shown in FIG. 6, first outer circumferential surface 12 of first contact portion 10 includes, for example, a first arc-shaped portion 27 and a first linear portion 13. First arc-shaped portion 27 is continuous to opposing ends of first linear portion 13. In the cross-section perpendicular to magnetic force direction Z, first outer circumferential surface 12 of first contact portion 10 is substantially in a D shape. A direction in which first linear portion 13 extends may be perpendicular to first direction 101. From another point of view, first linear portion 13 may extend along front-rear direction Y.

As shown in FIG. 6, in the cross-section perpendicular to magnetic force direction Z, first contact portion 10 may have an arc longer than a semicircle. Specifically, arc-shaped portion 27 has an arc longer than a semicircle. From another point of view, a central angle θ3 of first arc-shaped portion 27 is larger than 180°. Though a lower limit of central angle θ3 of first arc-shaped portion 27 is not particularly limited, it may be, for example, not smaller than 200° or not smaller than 220°. Though an upper limit of central angle θ3 is not particularly limited, it may be, for example, not larger than 320° or not larger than 300°.

[C. Tilted State]

Figure 7:
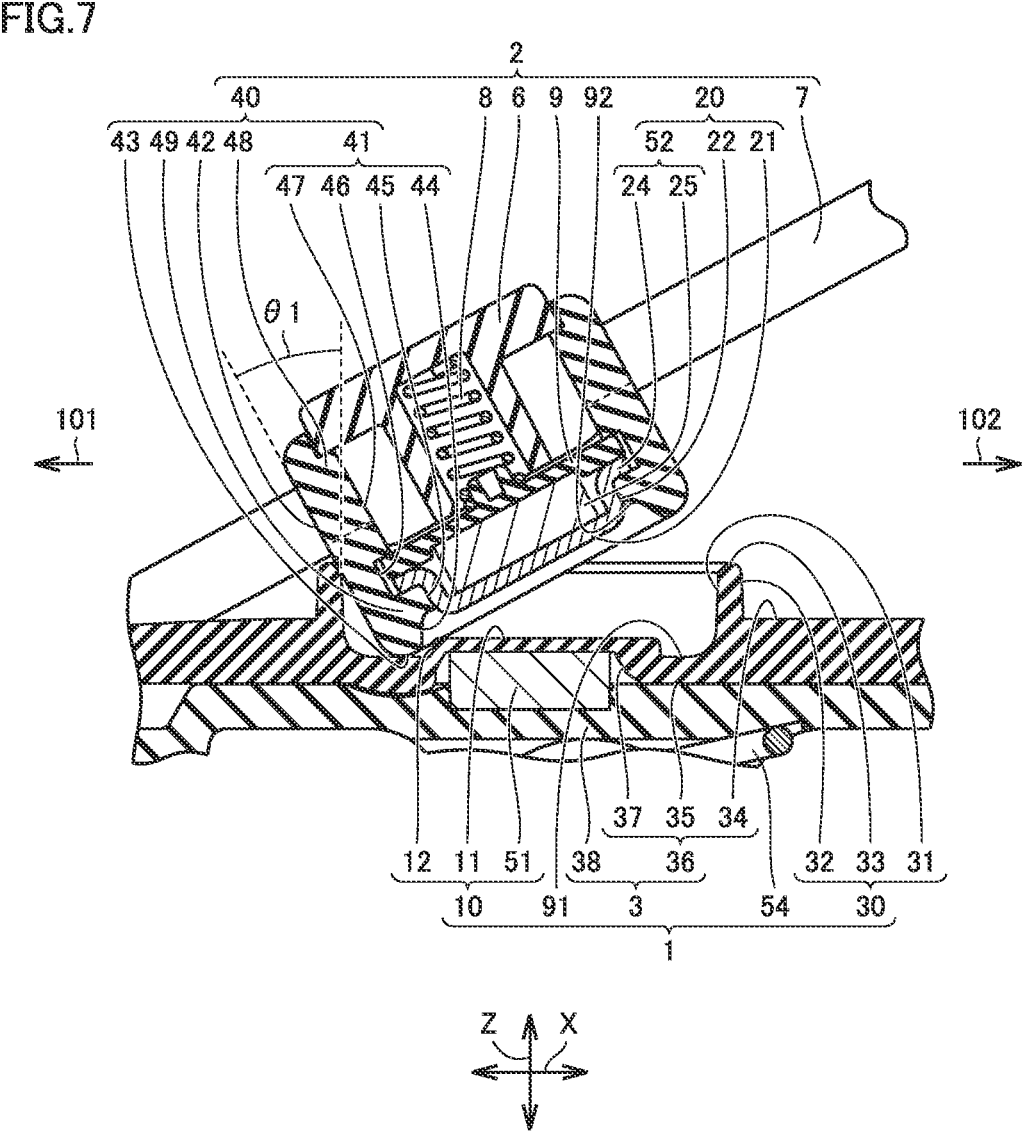
FIG. 7 shows an exemplary illustrative non-limiting drawing of a schematic diagram showing a state of a second apparatus tilted in a first direction.

FIG. 7 is a schematic diagram showing a state of second apparatus 2 tilted in first direction 101. When a user pulls cord 7 in first direction 101, second apparatus 2 is tilted toward first direction 101 with respect to first apparatus 1. As shown in FIG. 7, when projection 49 of second apparatus 2 is tilted in first direction 101, projection 49 comes in contact with first wall surface 31. An angle of tilting at the time when projection 49 comes in contact with first wall surface 31 on the side of first direction 101 is defined as a first angle θ1. First angle θ1 is an angle formed between first wall surface 31 and second outer circumferential surface 42 at the time when projection 49 comes in contact with first wall surface 31 on the side of first direction 101.

When projection 49 comes in contact with first wall surface 31, projection 49 may be distant from first contact portion 10. When the user further pulls cord 7 on the side of first direction 101 after projection 49 comes in contact with first wall surface 31, projection 49 pivots on the side of first direction 101 with a point of contact between first wall surface 31 and projection 49 being defined as a fulcrum. Second apparatus 2 is thus detached from first apparatus 1.

Figure 8:
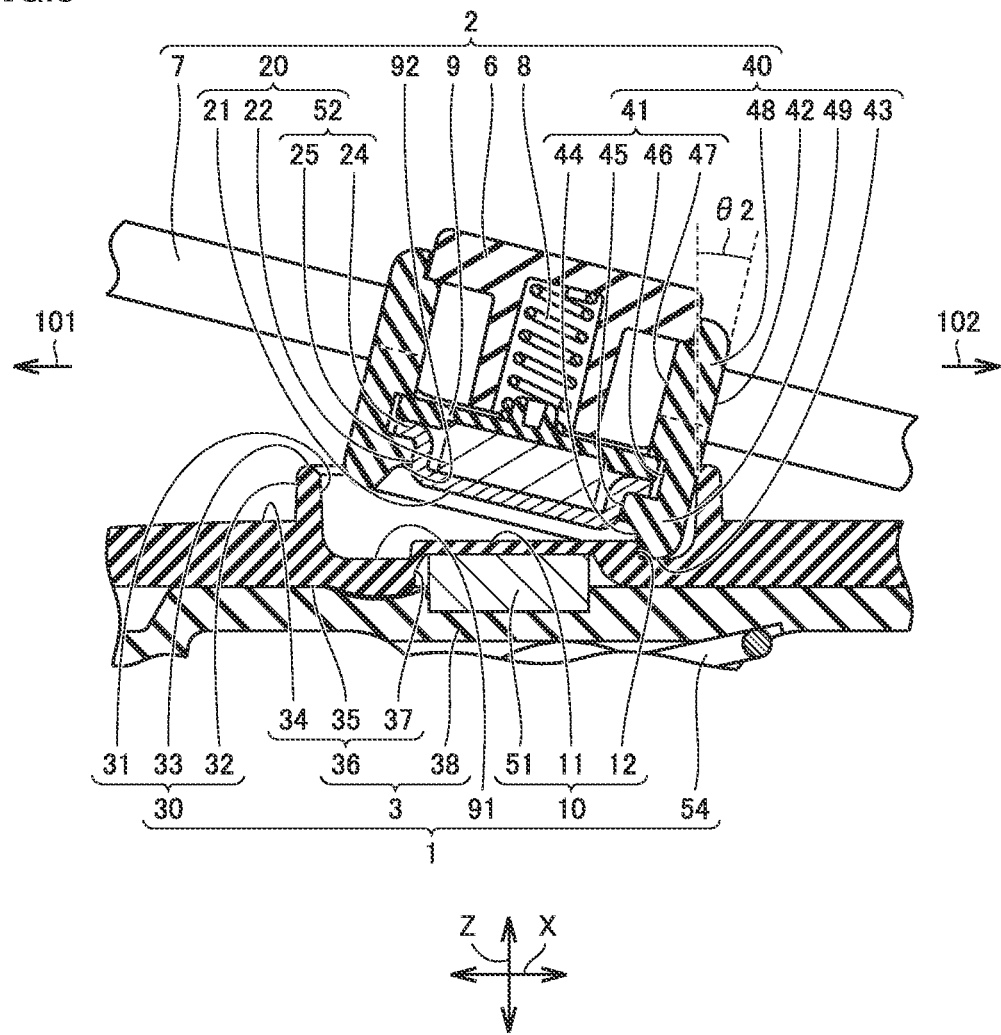
FIG. 8 shows an exemplary illustrative non-limiting drawing of a schematic diagram showing a state of the second apparatus tilted in a second direction.

FIG. 8 is a schematic diagram showing a state of second apparatus 2 tilted in second direction 102. When the user pulls cord 7 in second direction 102, second apparatus 2 is tilted on the side of second direction 102 with respect to first apparatus 1. As shown in FIG. 8, when projection 49 of second apparatus 2 is tilted in second direction 102, projection 49 comes in contact with first wall surface 31. An angle of tilting at the time when projection 49 comes in contact with first wall surface 31 on the side of second direction 102 is defined as a second angle θ2. Second angle θ2 is an angle formed between first wall surface 31 and second outer circumferential surface 42 at the time when projection 49 comes in contact with first wall surface 31 on the side of second direction 102.

As shown in FIG. 8, when projection 49 comes in contact with first wall surface 31, projection 49 may come in contact with first contact portion 10. In other words, when projection 49 is tilted on the side of second direction 102, projection 49 may be in contact with both of first wall surface 31 and first contact portion 10. When the user further pulls cord 7 on the side of second direction 102 after projection 49 comes in contact with first wall surface 31, projection 49 pivots on the side of second direction 102 with a point of contact between first wall surface 31 and projection 49 being defined as a fulcrum. Second apparatus 2 is thus detached from first apparatus 1.

As shown in FIGS. 7 and 8, regarding an angle of tilting at the time when projection 49 is titled and comes in contact with first wall surface 31, the angle (first angle θ1) at the time when projection 49 is tilted in first direction 101 may be larger than the angle (second angle θ2) at the time when projection 49 is tilted in second direction 102.

Figure 9:
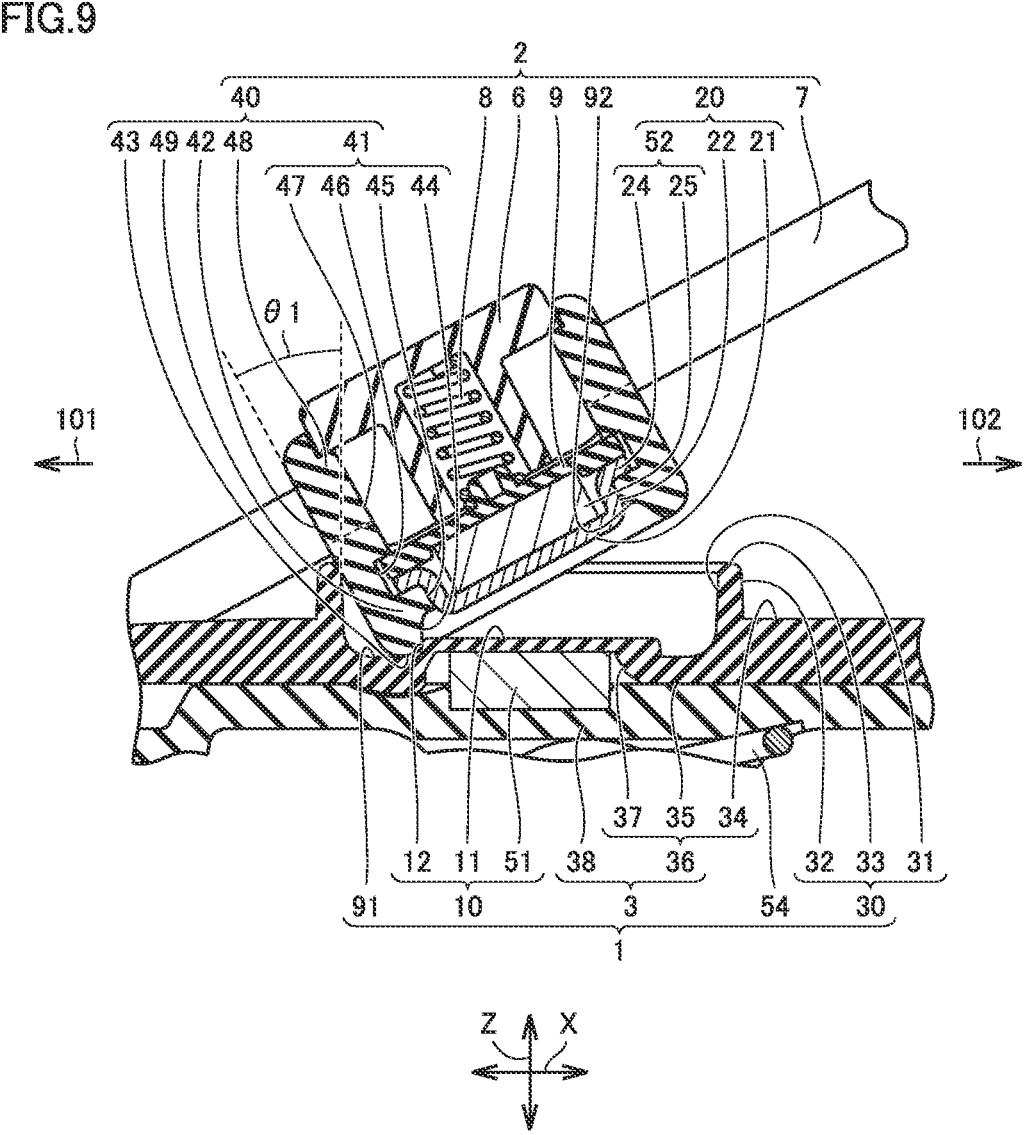
FIG. 9 shows an exemplary illustrative non-limiting drawing of a schematic diagram showing a modification of the state of the second apparatus tilted in the first direction.

FIG. 9 is a schematic diagram showing a modification of the state of second apparatus 2 tilted in first direction 101. As shown in FIG. 9, when projection 49 comes in contact with first wall surface 31, projection 49 may come in contact with first contact portion 10. In other words, when projection 49 is tilted on the side of first direction 101, projection 49 may come in contact with both of first wall surface 31 and first contact portion 10. Second outer circumferential surface 42 of projection 49 comes in contact with first wall surface 31. First inner circumferential surface portion 44 of projection 49 comes in contact with first outer circumferential surface 12 of first contact portion 10.

As shown in FIGS. 8 and 9, regarding an angle of tilting at the time when projection 49 is tilted and comes in contact with both of first contact portion 10 and first wall surface 31, the angle (first angle θ1) at the time when projection 49 is tilted in first direction 101 may be larger than the angle (second angle θ2) at the time when projection 49 is tilted in second direction 102.

When projection 49 is titled, tilting may be stopped by contact of projection 49 with at least one of first contact portion 10 and first wall surface 31. From another point of view, tilting of projection 49 may be stopped by contact with first contact portion 10, by contact with first wall surface 31, or by contact with both of first contact portion 10 and first wall surface 31. Regarding an angle of tilting at the time when tilting of projection 49 is stopped, the angle (first angle θ1) at the time when projection 49 is tilted in first direction 101 may be larger than the angle (second angle θ2) at the time when projection 49 is tilted in second direction 102. When tilting of projection 49 is stopped, a distance between first magnetic element 51 and second magnetic element 52 becomes longer. Therefore, in pulling second apparatus 2 upward for detachment, force necessary for detachment can be weaker.

Second Embodiment

A construction of connection structure 100 according to a second embodiment will now be described. Connection structure 100 according to the second embodiment is different from connection structure 100 according to the first embodiment mainly in including a protrusion 70 in a C shape and otherwise similar to connection structure 100 according to the second embodiment. The construction different from connection structure 100 according to the first embodiment will mainly be described below.

Figure 10:
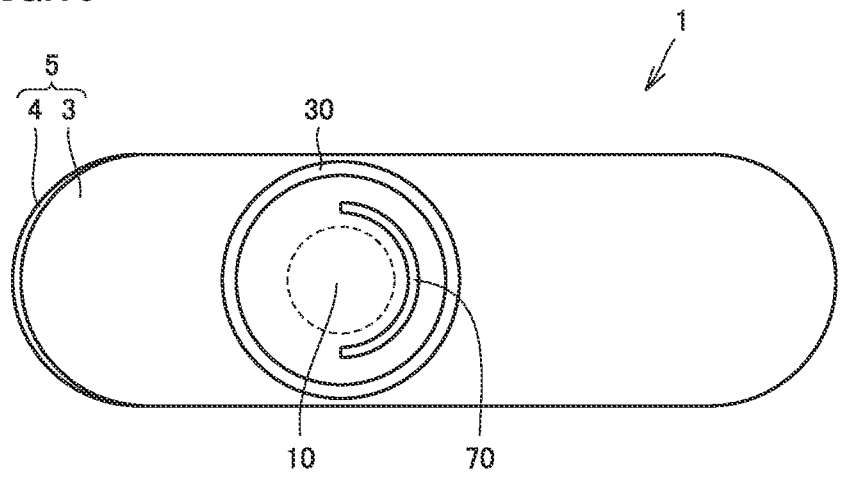
FIG. 10 shows an exemplary illustrative non-limiting drawing of a schematic top view showing a construction of the first apparatus of the connection structure according to a second embodiment.
Figure 10:
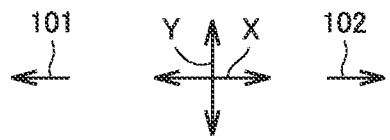
Figure 11:
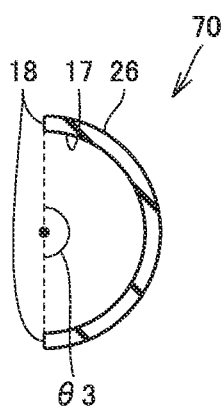
FIG. 11 shows an exemplary illustrative non-limiting drawing of a schematic cross-sectional view showing a construction of a protrusion according to the second embodiment.
Figure 11:
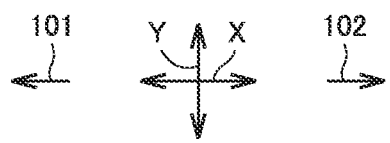

FIG. 10 is a schematic top view showing a construction of first apparatus 1 of connection structure 100 according to the second embodiment. As shown in FIG. 10, when viewed in magnetic force direction Z, first apparatus 1 includes a protrusion 70 substantially in a C shape. Protrusion 70 is curved as being convex toward second direction 102. Protrusion 70 opens on the side of first direction 101. FIG. 11 is a schematic cross-sectional view showing a construction of protrusion 70 according to the second embodiment. The cross-section shown in FIG. 11 is perpendicular to magnetic force direction Z.

As shown in FIG. 11, protrusion 70 includes a second arc-shaped portion 26, a third arc-shaped portion 17, and a pair of connection portions 18. One end of each of the pair of connection portions 18 is continuous to second arc-shaped portion 26 and the other end thereof is continuous to third arc-shaped portion 17. Second arc-shaped portion 26 is located on the side of second direction 102 relative to third arc-shaped portion 17. Third arc-shaped portion 17 is smaller in radius of curvature than second arc-shaped portion 26. A center of curvature of third arc-shaped portion 17 may coincide with a center of curvature of second arc-shaped portion 26. A central angle of each of second arc-shaped portion 26 and third arc-shaped portion 17 is set, for example, to 180°. The central angle of each of second arc-shaped portion 26 and third arc-shaped portion 17 may be, for example, not smaller than 150° and not larger than 210°.

Figure 12:
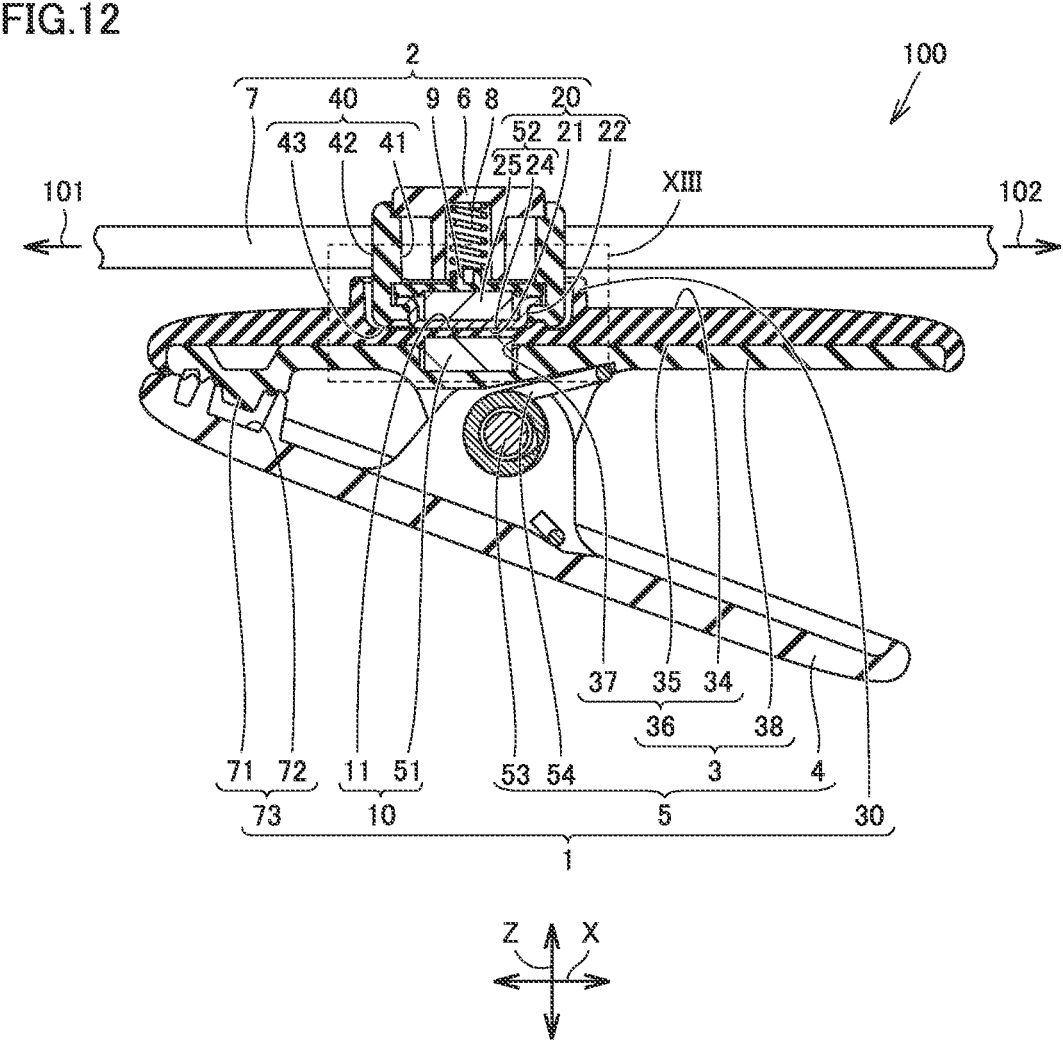
FIG. 12 shows an exemplary illustrative non-limiting drawing of a schematic cross-sectional view showing a construction of the connection structure according to the second embodiment.
Figure 13:
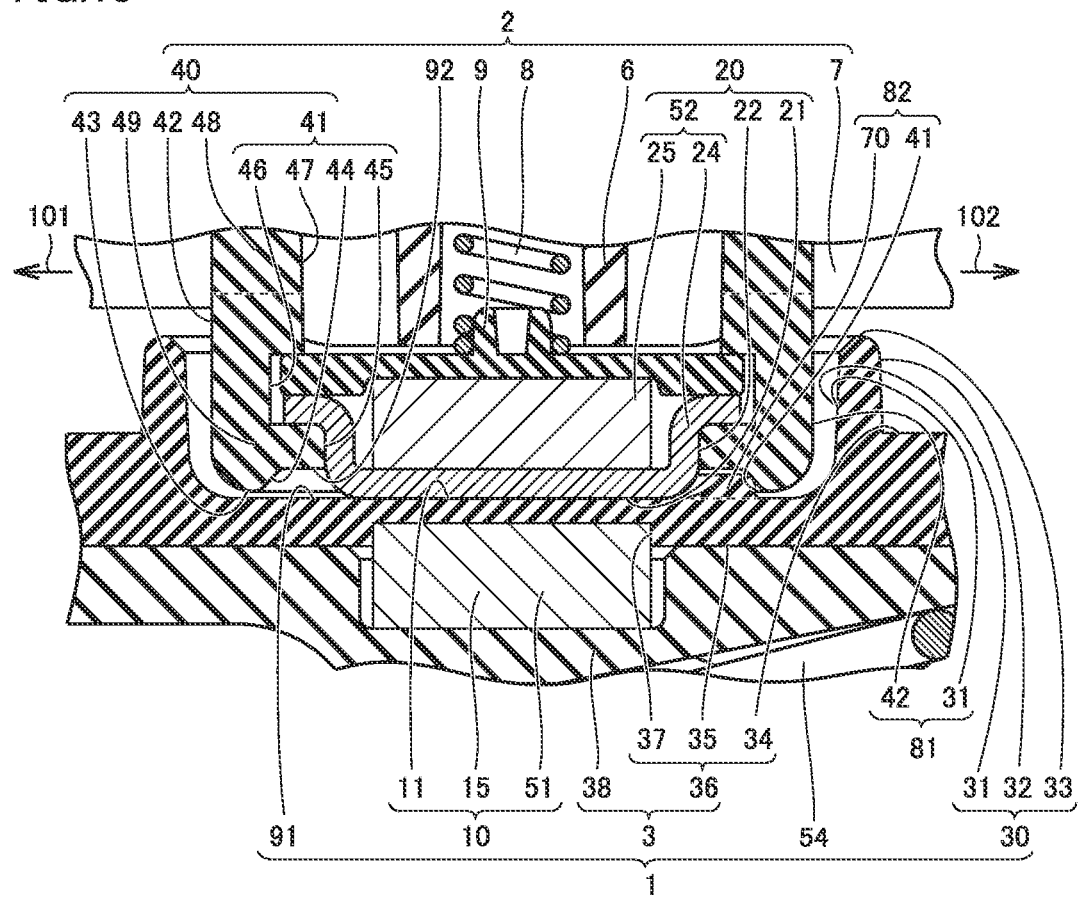
FIG. 13 shows an exemplary illustrative non-limiting drawing of an enlarged schematic diagram of a region XIII in FIG. 12.
Figure 13:
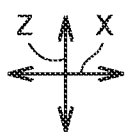

FIG. 12 is a schematic cross-sectional view showing the construction of connection structure 100 according to the second embodiment. The cross-section shown in FIG. 12 is in parallel to each of magnetic force direction Z and lateral direction X. FIG. 13 is an enlarged schematic diagram of a region XIII in FIG. 12.

As shown in FIG. 13, in magnetic force direction Z, first contact surface 11 may be located as high as first bottom surface 91. In magnetic force direction Z, second contact surface 21 may be located under second lower surface 43 of hollow member 40. In lateral direction X, protrusion 70 is located on the side of second direction 102 relative to second outer surface 22 of second contact portion 20.

When second apparatus 2 is pulled in second direction 102, protrusion 70 may be in contact with second inner circumferential surface 41 of projection 49 on the side of second direction 102. From another point of view, when projection 49 is tilted toward second direction 102, pivot of projection 49 may be restricted by protrusion 70. In contrast, when projection 49 is tilted toward first direction 101, pivot of projection 49 does not have to be restricted by protrusion 70. When second apparatus 2 pivots as moving away from first apparatus 1, pivot of second apparatus 2 around the side of second direction 102 may be restricted more than pivot of second apparatus 2 around the side of first direction 101.

Third Embodiment

Figure 14:
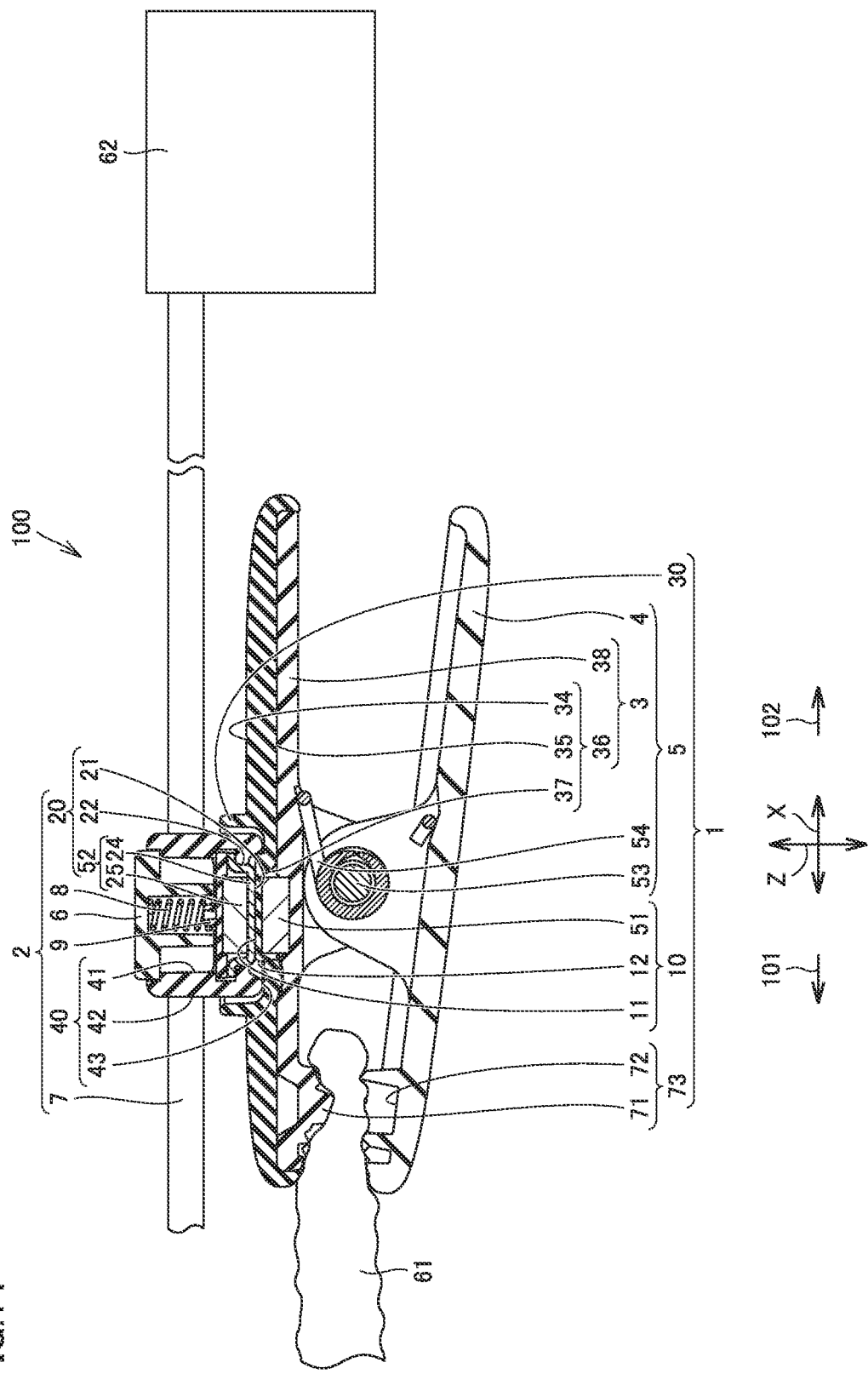
FIG. 14 shows an exemplary illustrative non-limiting drawing of a schematic cross-sectional view showing a construction of an attachment structure according to a third embodiment.

A construction of an attachment structure according to a third embodiment will now be described. FIG. 14 is a schematic cross-sectional view showing the construction of the attachment structure according to the third embodiment.

An attachment structure 100 according to the third embodiment includes a bedclothes fitting instrument 1 and an instrument 2. Attachment structure 100 according to the third embodiment corresponds to connection structure 100 according to the first and second embodiments. Bedclothes fitting instrument 1 is fitted to bedclothes 61. Bedclothes fitting instrument 1 corresponds to first apparatus 1 of connection structure 100 according to the first and second embodiments. As shown in FIG. 14, bedclothes fitting instrument 1 includes a bedclothes fixed portion 73, first contact portion 10, fastener 5, and annular wall portion 30. Bedclothes fixed portion 73 is fixed to bedclothes 61. For example, a pillow is provided as bedclothes 61, however, the bedclothes is not limited to the pillow. Bedclothes 61 may be, for example, a comforter (top cover), a mattress, a blanket, a bed, or a sheet.

Bedclothes fixed portion 73 is composed of first pressing member 71 and second pressing member 72. A left end of first pinch member 3 serves as first pressing member 71. A left end of second pinch member 4 serves as second pressing member 72. When the user pinches a right end of first pinch member 3 and a right end of second pinch member 4, each of first pinch member 3 and second pinch member 4 pivot with shaft member 53 being defined as a fulcrum. An interval between first pressing member 71 and second pressing member 72 thus increases. Bedclothes 61 is arranged between first pressing member 71 and second pressing member 72. Bedclothes 61 is pinched by first pressing member 71 and second pressing member 72. Bedclothes fixed portion 73 is thus fixed to bedclothes 61. Bedclothes fixed portion 73 is located, for example, on the side of first direction 101 when viewed from first contact portion 10. Bedclothes fixed portion 73 is not located on an extension in magnetic force direction Z.

Instrument 2 corresponds to second apparatus 2 of connection structure 100 according to the first and second embodiments. Instrument 2 is, for example, a strap. Instrument 2 may be a game console 62 including a strap. Instrument 2 mainly includes second contact portion 20, hollow member 40, cord holder 6, coil spring 8, reception plate 9, and cord 7. Bedclothes fitting instrument 1 and instrument 2 are brought in contact as being rotatable relatively to each other around magnetic force direction Z and being attachable to and detachable from each other as a result of contact between first contact portion 10 and second contact portion 20 with magnetic force of first magnetic element 51 and second magnetic element 52.

As shown in FIGS. 3 and 13, bedclothes fitting instrument 1 and instrument 2 include a movement restriction portion 81. Movement restriction portion 81 restricts movement of first contact portion 10 and second contact portion 20 relative to each other in the direction perpendicular to magnetic force direction Z while first contact portion 10 and second contact portion 20 are brought in contact with each other. Movement restriction portion 81 is defined, for example, by first outer circumferential surface 12 and second inner circumferential surface 41 (see FIG. 3). First outer circumferential surface 12 is defined by first linear portion 13 and an arc of a length equal to or longer than a semicircular arc (first arc-shaped portion 27) (see FIG. 6). Wobbling in lateral direction X of instrument 2 is suppressed by first outer circumferential surface 12. Movement restriction portion 81 may be defined by a combination of first wall surface 31 of annular wall portion 30 and second outer circumferential surface 42 of projection 49 in addition to or instead of the construction above.

As shown in FIG. 3, bedclothes fitting instrument 1 and instrument 2 include a pivot restriction portion 82. Pivot restriction portion 82 restricts pivot around the side opposite to the side of bedclothes fixed portion 73 with respect to first contact portion 10 more than pivot around the side of bedclothes fixed portion 73 when first contact portion 10 and second contact portion 20 pivot relative to each other as being moving away from each other in magnetic force direction Z from the state that first contact portion 10 and second contact portion 20 are brought in contact with each other. As shown in FIG. 3, pivot restriction portion 82 may be defined by first outer circumferential surface 12 of first contact portion 10 and second inner circumferential surface 41 of projection 49.

Pivot restriction portion 82 does not have to restrict pivot around the side of bedclothes fixed portion 73 but may restrict pivot around the side opposite to the side of bedclothes fixed portion 73 with respect to first contact portion 10 when first contact portion 10 and second contact portion 20 pivot relative to each other as being moving away from each other in magnetic force direction Z from the state that first contact portion 10 and second contact portion 20 are brought in contact with each other. As shown in FIGS. 7 and 8, when second contact portion 20 pivots toward bedclothes fixed portion 73, second inner circumferential surface 41 of projection 49 does not come in contact with first outer circumferential surface 12 of first contact portion 10, and when second contact portion 20 pivots toward the side opposite to the side of bedclothes fixed portion 73, second inner circumferential surface 41 of projection 49 may come in contact with first outer circumferential surface 12 of first contact portion 10.

As shown in FIG. 13, pivot restriction portion 82 may be defined by protrusion 70 and second inner circumferential surface 41 of projection 49. When second contact portion 20 pivots toward bedclothes fixed portion 73, second inner circumferential surface 41 of projection 49 on the side of bedclothes fixed portion 73 does not come in contact with protrusion 70, and when second contact portion 20 pivots toward the side opposite to the side of bedclothes fixed portion 73, second inner circumferential surface 41 of projection 49 on the side opposite to the side of bedclothes fixed portion 73 may come in contact with protrusion 70 (see FIG. 13).

An angle of restriction of pivot of instrument 2 at the time of pivot of instrument 2 around the side of bedclothes fixed portion 73 when first contact portion 10 and second contact portion 20 pivot relative to each other as being moving away from each other in magnetic force direction Z from the state that first contact portion 10 and second contact portion 20 are brought in contact with each other may be larger than an angle of restriction of pivot of instrument 2 at the time of pivot of instrument 2 around the side opposite to the side of bedclothes fixed portion 73 with respect to first contact portion 10. From another point of view, an angle (first angle θ1) of restriction of pivot of instrument 2 at the time of pivot of instrument 2 around the side of bedclothes fixed portion 73 may be larger than an angle (second angle θ2) of restriction of pivot of instrument 2 at the time of pivot of instrument 2 around the side opposite to the side of bedclothes fixed portion 73 (see FIGS. 8 and 9).

Though bedclothes fitting instrument 1 is described above by way of example of first apparatus 1, first apparatus 1 is not limited to bedclothes fitting instrument 1. First apparatus 1 may be an electronic device, a peripheral device of an electronic device, furniture, apparel, accessories, toys, or the like. Fixed portion 73 of first apparatus 1 is, for example, a clip, however, it is not limited to the clip. Fixed portion 73 of first apparatus 1 may be, for example, a suction cup, a hook, or the like. First apparatus 1 may be attached to an object other than bedclothes 61. First apparatus 1 may be attached, for example, to clothing such as a shirt or furniture such as a desk.

Second apparatus 2 is, for example, a strap, however, it is not limited to the strap. Second apparatus 2 may be an electronic device, a peripheral device of an electronic device, furniture, apparel, accessories, toys, or the like. Second apparatus 2 may be an attachment tool such as a clip.

Pivot restriction portion 82 is not limited to such a construction as above that the wall surface abuts earlier in pivot toward one side than in pivot toward the other side. Pivot restriction portion 82 may be constructed, for example, such that greater force is required in pivot toward one side than in pivot toward the other side. In order to adjust force to restrict pivot, for example, a buffer material may be used. Alternatively, another magnet may further be provided such that stronger attraction force acts in pivot toward one side than in pivot toward the other side.

Game console 62 includes, for example, a storage (not shown), a processor (not shown), and/or a display (not shown). The storage is implemented, for example, by a dynamic random access memory (DRAM). An application program such as a game may be stored in the storage. The processor may be able to perform information processing by reading an application program. An image generated as a result of information processing performed, for example, by the processor may be shown on the display.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A connection structure comprising:
   a first apparatus; and
   a second apparatus, wherein
   the first apparatus includes
      a first bottom surface,
      a first contact portion that protrudes from the first bottom surface, includes a first contact surface at a top portion, and includes a first magnetic element, and
      a surrounding wall surface that protrudes from the first bottom surface above the first contact surface to surround the top portion,
   the second apparatus includes
      a second contact portion that defines a second contact surface and includes a second magnetic element, and
      a hollow projection that surrounds the second contact portion,
   the first apparatus and the second apparatus are connected as being rotatable relatively to each other around a magnetic force direction and attachable to and detachable from each other as a result of contact between the first contact surface and the second contact surface by attraction of the first magnetic element and the second magnetic element to each other by magnetic force,
   the projection is located between the wall surface and the first contact portion with a clearance being interposed where the projection can be tilted in accordance with pulling including a direction component perpendicular to the magnetic force direction, and
   in the first apparatus, a clearance between the top portion and the projection in a first direction of directions perpendicular to the magnetic force direction is larger than a clearance between the top portion and the projection in a second direction of the directions perpendicular to the magnetic force direction, the second direction being different from the first direction.

2. The connection structure according to claim 1, wherein the wall surface is in a circular surrounding shape,
   the projection is annularly hollow, and
   the first contact portion is in such a shape that a part of an outer circumferential surface of a column is missing.

3. The connection structure according to claim 2, wherein in a cross-section perpendicular to the magnetic force direction, the first contact portion has an arc of a length equal to or longer than a semicircular arc.

4. The connection structure according to claim 2, wherein in a cross-section perpendicular to the magnetic force direction, the first contact portion includes a linear portion and an arc-shaped portion continuous to opposing ends of the linear portion, and
   a central angle of the arc-shaped portion is larger than 180°.

5. The connection structure according to claim 1, wherein the second apparatus includes a second bottom surface, and
   the second contact portion protrudes from the second bottom surface.

6. The connection structure according to claim 5, wherein the projection protrudes from the second bottom surface, and
   the second contact portion protrudes such that the second contact surface is lower than the projection.

7. The connection structure according to claim 1, wherein when the projection is tilted, tilting is stopped by contact of the projection with at least one of the first contact portion and the wall surface, and
   regarding an angle of tilting when tilting of the projection is stopped, the angle when the projection is tilted in the first direction is larger than the angle when the projection is tilted in the second direction.

8. The connection structure according to claim 1, wherein regarding an angle of tilting when the projection is tilted and comes in contact with both of the first contact portion and the wall surface, the angle when the projection is tilted in the first direction is larger than the angle when the projection is tilted in the second direction.

9. The connection structure according to claim 1, wherein regarding an angle of tilting when the projection is tilted and comes in contact with the wall surface, the angle when the projection is tilted in the first direction is larger than the angle when the projection is tilted in the second direction.

10. The connection structure according to claim 1, wherein
    the first magnetic element includes a first magnet,
    the second magnetic element includes a second magnet, and
    a member that suppresses a magnetic flux density is provided on the first contact surface or between the first contact surface and the first magnet or on the second contact surface or between the second contact surface and the second magnet.

* * * * *